(12) United States Patent
Makino

(10) Patent No.: US 6,566,621 B2
(45) Date of Patent: May 20, 2003

(54) METAL-CERAMIC COMPOSITE AND VACUUM SWITCH UNIT USING THE SAME

(75) Inventor: Yusuke Makino, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 09/995,578

(22) Filed: Nov. 29, 2001

(65) Prior Publication Data

US 2002/0130108 A1 Sep. 19, 2002

(30) Foreign Application Priority Data

Nov. 30, 2000 (JP) .................................. 2000-364860

(51) Int. Cl.[7] ................................................ H01H 33/66
(52) U.S. Cl. ....................... 218/123; 428/632; 218/134
(58) Field of Search ............................... 218/123–125, 218/134–137, 139; 428/627, 632, 633

(56) References Cited

U.S. PATENT DOCUMENTS

| | | | | |
|---|---|---|---|---|
| 4,077,114 A | * | 3/1978 | Sakuma | .................. 218/130 |
| 4,795,866 A | * | 1/1989 | Hoene et al. | ................ 218/134 |
| 5,313,030 A | * | 5/1994 | Kusserow et al. | ........... 218/136 |
| 5,364,010 A | | 11/1994 | Mizuhara | |
| 5,594,224 A | * | 1/1997 | Tanimizu et al. | ............ 218/134 |
| 5,916,520 A | | 6/1999 | Maruyama et al. | |

FOREIGN PATENT DOCUMENTS

| | | | |
|---|---|---|---|
| EP | 0 286 335 A1 | 10/1988 | |
| EP | 0 743 131 A1 | 11/1996 | |
| JP | 7-172946 | 7/1995 | ........... C04B/37/02 |
| JP | 7-230744 | 8/1995 | .......... H01H/33/66 |

OTHER PUBLICATIONS

Abstract JP7230744, Aug. 29, 1995.
Abstract JP7172946, Jul. 11, 1995.
European Search Report for EP 01 31 0053 dated Nov. 5, 2002.

* cited by examiner

Primary Examiner—M. Fishman
(74) Attorney, Agent, or Firm—Sughrue Mion, PLLC

(57) ABSTRACT

A metal-ceramic composite (a vacuum switch unit 50) having a metal member 13 having a tubular portion 13b, and a cylindrical ceramic member 55. The metal-ceramic composite (the vacuum switch unit 50) has a structure in which an end face of the tubular portion 13b of the metal member 13 is butt joined via a joint metal layer 15 to an end face 55a of the cylindrical ceramic member 55 in an edge sealed manner. In order to provide a metal-ceramic composite having a high joint strength which is less likely to cause defects such as cuts or cracks at the joint, the joint metal layer 15 and the ceramic member 55 contact each other at an annular region of W (mm) in average width which extends circumferentially about the end face 55a of the ceramic member 55. Furthermore, W and D have respective values which satisfy $D \geq 30$ ①; and $(1/60) \times D \leq W \leq (D/30)+3.1$ ② where D (mm) is an outer diameter of the ceramic member.

7 Claims, 5 Drawing Sheets

METAL-CERAMIC COMPOSITE AND VACUUM SWITCH UNIT USING THE SAME

BACKGROUND OF THE INVENTION

1. Field of the Invention

The present invention relates to a metal-ceramic composite and to a vacuum switch unit using the same.

2. Description of the Related Art

As a switch for selectively switching the supply of current for controlling application of a high-voltage load, a vacuum switch unit is being widely used to prevent sparking attendant on current shutoff and subsequent discharge short to thereby secure sufficient insulation properties. The vacuum switch unit includes an internally evacuated ceramic container for enclosing a contact. In such a vacuum unit, typically, the ceramic container is formed from a cylindrical ceramic member, with its opposite ends being covered by a metallic covering member. The metallic covering member and the ceramic member are brazed to each other to form a metal-ceramic composite.

To hermetically join a metal member to the end faces of the cylindrical ceramic member, an edge seal structure or a butt seal structure can be employed. In the former, the end face of a tubular portion of the metal member is butt joined via a brazing material to the end face of the cylindrical ceramic member. In the latter, the planar surface of a plate-like portion of the metal member such as a metal lid laps over the end face of the ceramic member, with a brazing material being interposed therebetween for joining the confronting faces. In particular, conventional vacuum switch units have hitherto employed either the edge seal structure or the butt seal structure irrespective of the outer diameter or the wall thickness of the ceramic member. For example, Japanese Patent Laid-open Pub. No. Sho 52-59863 discloses making the metal member from an alloy having a low coefficient of expansion such as Kovar to thereby obtain a good composite with few defects no matter whether an edge seal or a butt seal is used. Japanese Patent Laid-open Pub. No. Hei 7-172946 describes, on the assumption that a butt seal structure is employed, that a good composite can be obtained by defining the ratio of the wall thickness of the ceramic member to the thickness of the lapped joint portion of the metal member and by defining the coefficient of linear expansion of the material or the melting point of the brazing material.

In terms of the technique disclosed in the above patent publication, however, a problem may still remain. For example, if the ceramic member has variously different outer diameters depending on the product, the joint structure employed therein may possibly cause a stress concentration at a particular site of the brazing joint. This is due to different coefficients of linear expansion between the ceramic member and the metal member, at the time of cooling after brazing, thus tending to produce defective units having an extremely low joint strength.

SUMMARY OF THE INVENTION

It is therefore the object of the present invention to provide a metal-ceramic composite having a high joint strength which is less likely to cause defects such as cuts or cracks at the joint, by employing an optimum joint structure depending on the dimensions of the ceramic member, and to provide a vacuum switch unit using such a metal-ceramic composite.

The above object has been achieved, according to a first aspect of the present invention, by providing a metal-ceramic composite comprising a metal member having a tubular portion and a cylindrical ceramic member, the metal-ceramic composite having a structure in which an end face of the tubular portion of the metal member is butt joined via a joint metal layer to an end face of the cylindrical ceramic member in an edge sealed manner, wherein the joint metal layer and the ceramic member contact each other at an annular region of W (mm) in average width which extends circumferentially about the end face of the ceramic member, and wherein W and D have respective values which satisfy:

$$D \geq 30 \qquad \text{①};$$

and $$(1/60) \times D \leq W \leq (D/30) + 3.1 \qquad \text{②}$$

where D (mm) is an outer diameter of the ceramic member.

According to a second aspect, the present invention provides a vacuum switch unit comprising the metal-ceramic composite according to the present invention; a pair of covering members which cover opposite ends of the ceramic member, for forming a switch covering space within the interior of the ceramic member which is cylindrically shaped; and a pair of switch electrode members arranged so as to be able to come closer to or away from each other within the switch covering space, the pair of switch electrode members providing a switch contact portion.

The inventors extensively studied the relationship between the form of the joint structure and the dimensions of the ceramic member when the metal member is joined to the tubular ceramic member by way of a joint metal layer (e.g., brazing material). Consequently, for a ceramic member having a 30 mm or more outer diameter (the above condition ①) which is generally widely used for the vacuum switch unit, etc., the present inventors discovered that when the width W of the joint region becomes smaller than the outer diameter D, cuts or other defects tend to occur at the inner edge or outer edge of the contact region. Further examination led to the conclusion that such cuts easily occur when a butt seal structure is adopted of the two kinds of joint structures.

Based on these studies, experiments were carried out to identify the conditions for achieving a good joint. It was found that even though the thickness of the ceramic member cannot be made large enough against its outer diameter D, hence the joint region width W becomes less than a certain limit value, more specifically, the upper limit Wmax expressed by Wmax=D/30+3.1, adoption of the edge seal structure in particular as the joint structure would resist cuts or other defects in the ceramic member arising from stress concentration at the inner edge or the outer edge of the joint region and could ensure a composite having a high joint strength. The present invention was thus completed. Application of such a composite to the vacuum switch unit would make it possible to enhance the durability of the joint formed between the ceramic member, i.e., the switch outer envelope and the metallic covering member, to realize a vacuum switch having a long service life which hardly develops leaks or other deficiencies. Reduction of such defective joints contributes to a remarkable improvement in product yield.

When the joint region width W is less than Wmax, adoption of other joint structures, e.g., a butt seal structure as opposed to the edge seal structure, may induce a remarkable occurrence of the above defects at the joint, resulting in lower durability attributable to insufficient strength at the joint and in lower product yield arising from an increase in the defect rate. When the joint region width W is larger than Wmax, it is not so advantageous to adopt an edge seal structure, since a good joint structure can also be obtained from another method such as the butt seal method. For example, the butt seal structure is comparatively simple; the only thing needed is to lap join the lid-shaped metal member to the end face of the ceramic member by way of a brazing layer, whereas in the edge seal structure, a cylindrical portion is indispensable for the butt joint, and the vacuum switch unit must be equipped with separate metal lids to cover the internal space. This adds to the number of parts and steps, which leads to comparatively high costs. Consequently, when W is more than Wmax, it is sometimes disadvantageous in terms of cost to adopt an edge seal structure.

On the other hand, when the joint width W is less than the lower limit Wmin which satisfies Wmin=(1/60)×D (mm), the joint area against the outer diameter D of the ceramic member becomes relatively too small, and hence it becomes impossible to achieve sufficient joint strength. Furthermore, a joint width W less than Wmin may induce a lowering of the strength of the ceramic member itself because of reduced thickness.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENTS

A preferred embodiment of the present invention will now be described with reference to the drawings. However, the present invention should not be construed as being limited thereto.

Figure 1:
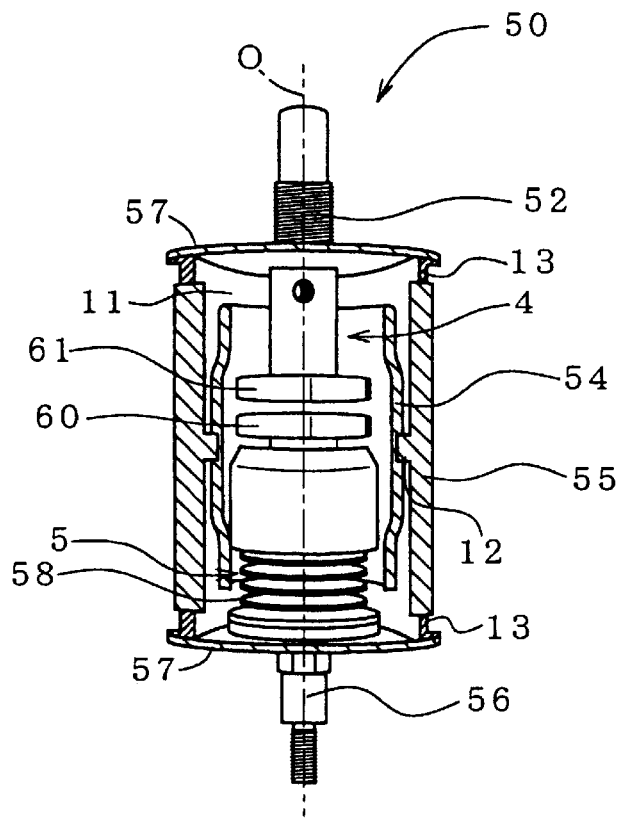
FIG. 1 is a sectional view of an exemplary vacuum switch unit using a metal-ceramic composite in accordance with the present invention.

FIG. 1 shows an exemplary vacuum switch unit using a metal-ceramic composite in accordance with the present invention. The vacuum switch unit generally designated at 50 comprises a cylindrical tubular member 55 in the form of a ceramic member providing an outer envelope, and a cylindrical metallic arc-shield member 54 disposed inside the tubular member 55. The inner peripheral surface of the tubular member 55 is formed with a circumferentially extending ridge 12 such that the outer peripheral surface of the arc-shield member 54 is joined via a brazing material layer not shown to the inner peripheral surface of the ridge 12. The tubular member 55 is made of, e.g., alumina-based ceramic (e.g., containing 92 percent alumina by mass) and has an outer peripheral surface covered by a topcoat not shown.

Figure 2:
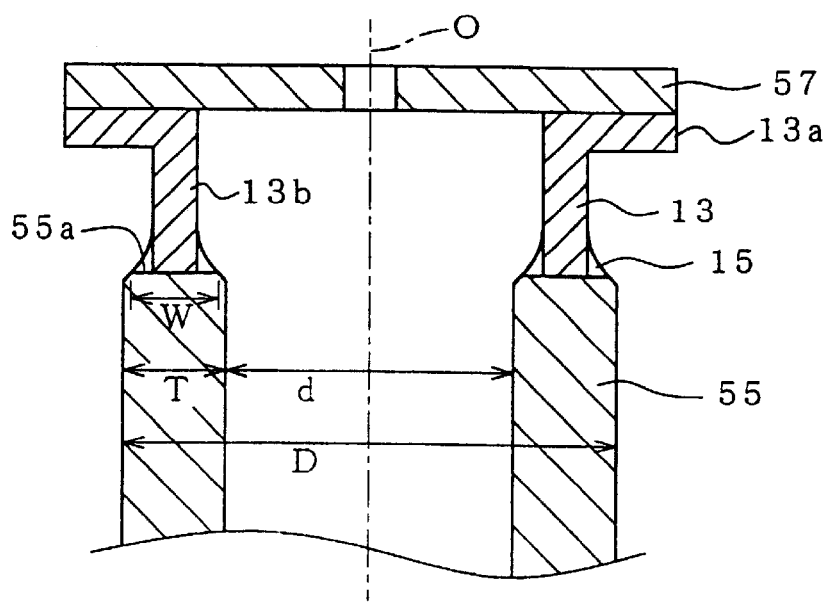
FIG. 2 is a sectional view of a joint structure between a ceramic member and a metal member, based on the edge seal method.

The tubular member 55 is provided with a pair of covering members 57 in the form of disk lids for covering respective end portions, to thereby define a switch covering space 11 in the interior. As seen in FIG. 2, the covering members 57 are provided in such a manner that they cover end faces of cylindrical metal members 13 joined to opposite end faces of the tubular member 55 by means of an edge sealed structure. As is apparent from FIGS. 3(a) and 3(b), each metal member 13 has a tubular portion 13b whose one end face is butt welded in an edge sealed fashion to the end face 55a of the tubular member (ceramic member) 55 by way of a brazing material 15 that provides a joint metal layer. As shown in FIG. 2, the other end face of the tubular portion 13b is provided with a circumferential flange 13a which protrudes radially outward from the outer peripheral surface of the tubular portion 13b, with the covering member 57 being joined via a brazing material layer not shown to the planar surface of the flange 13a.

In this embodiment, the metal members 13 and the covering members 57 are made of an Fe—Ni—Co alloy (e.g., KOVAR (trade name): Fe—29 wt % Ni—17 to 18 wt % Co), but instead, other materials such as a stainless steel or a Cu alloy may be employed. The brazing material 15 can be, for example, an Ag—Cu based brazing material so as to form a reaction layer with an active metal component (e.g., Ti) and ceramic between the brazing material 15 and the tubular member 55 in the form of the ceramic member.

Within the interior of the switch covering space 11 is disposed a fixed electrode member 4 which extends through one of the pair of covering members 57. The fixed electrode member 4 includes a fixed-side terminal portion 52 which is formed at its base external to the switch covering space 11, and a fixed-side switch contact portion (switch electrode member) 61 which is formed at its extremity internal to the switch covering space 11. A movable electrode member 5 extends through the other of the pair of covering members 57, the movable electrode member 5 being movable in the direction of an axis O of the tubular member 55. The movable electrode member 5 includes a movable-side terminal portion 56 which is formed at its base external to the switch covering space 11, and a movable-side switch contact portion (switch electrode member) 60 which is formed at its extremity internal to the switch covering space 11, the movable-side switch contact portion 60 coming into abutment against or apart from the fixed-side switch contact portion 61 as a result of movement of the movable-side switch contact portion 60. The arc-shield member 54 is disposed so as to embrace the fixed-side switch contact portion 61 and the movable-side switch contact portion 60. The movable electrode member 5 is moved closer to or away from the fixed-side switch contact portion 61 by the action of metal bellows 58.

Figure 3:
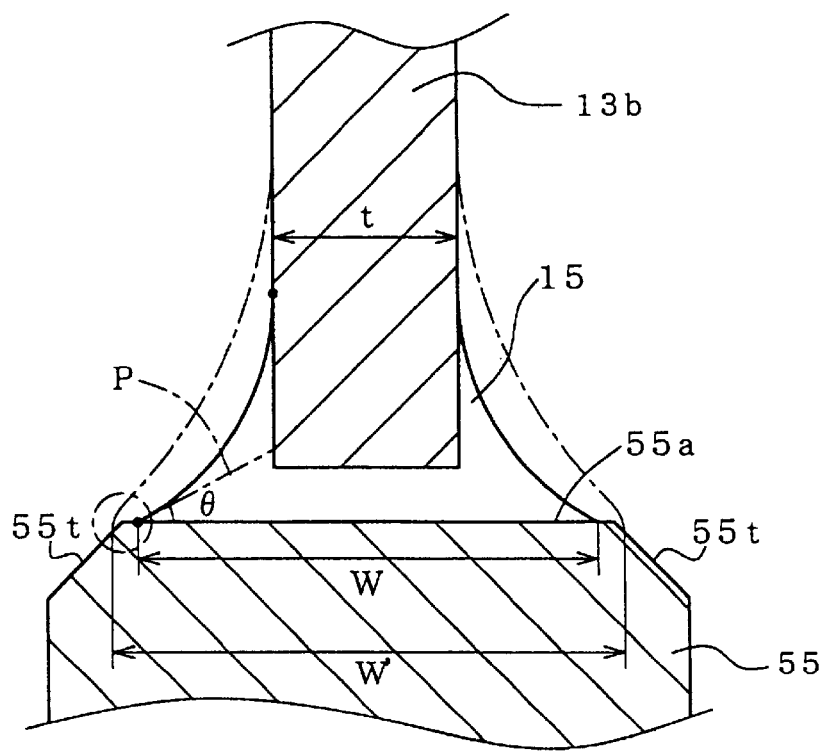
FIGS. 3(a) and 3(b) are enlarged views of the joint of FIG. 2.
Figure 3:
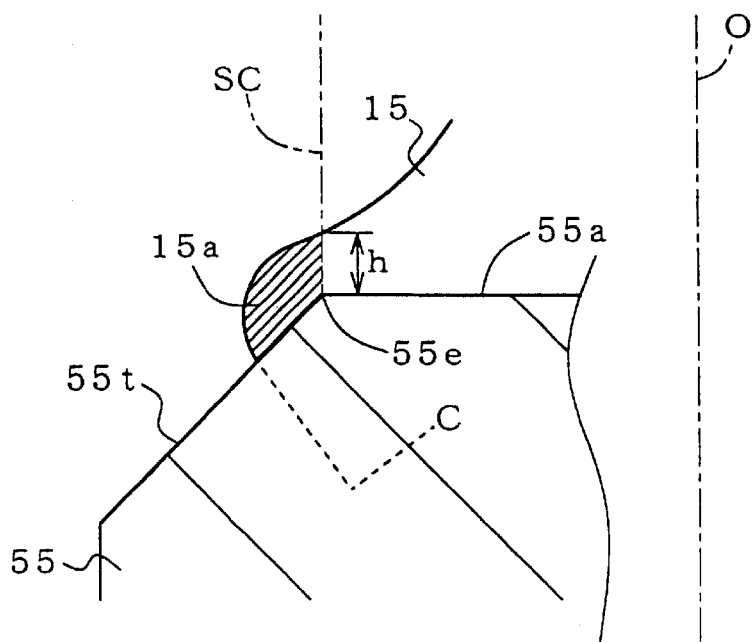

FIG. 3(a) shows, in an enlarged section, a joint between the tubular member 55 and the metal member 13. The brazing material 15 is in contact with the end face 55a of the tubular member 55 at a circumferentially extending annular region having an average width of W (mm). Let D (mm:

FIG. 2) be an outer diameter of the tubular member 55, then values of W and D are set so as to satisfy $$D \geq 30 \qquad \qquad ①;$$

and $$(1/60) \times D \leq W \leq (D/30) + 3.1 \qquad \qquad ②$$

A chamfered portion 55t is formed at the inner peripheral edge and/or at the outer peripheral edge of the end face 55a of the tubular member (ceramic member) 55 (although the chamfered portion 55t is formed herein both at the inner peripheral edge and at the outer peripheral edge, it may be formed either at the inner peripheral edge or at the outer peripheral edge).

The inner edge portion and/or the outer edge portion of the brazing material fillet 15 have no laps with the chamfered portion 55t when the brazing material has a small volume. When the volume of the brazing material increases, however, the brazing material may partially flow in a lapping manner onto the chamfered portion 55t as indicated by a chain dotted line in FIGS. 3(a) and 3(b). In this case, the joint region width W of the brazing material 15 point metal layer) is a radial width w around the center axis O of an orthographically projected image of the joint region on a projected plane brazing material fillet 15 laps over the chamfered portion 55t as indicated by the chain dotted line, W' in the diagram designates the joint region width.

The expression ② is explained in greater detail below. Study by the present inventors has revealed that, upon cooling after brazing, for example, the tubular member 55 in the form of the ceramic member is apt to suffer from cracks C or other defects at the outer edge or the inner edge of the joint region as shown in FIG. 3(b). In particular, provided that the brazing material fillet 15 laps over the chamfered portion 55t as seen in FIG. 3(b), cracks C or other defects tend to occur. This is a result of significant stress concentration as a thickness h (which is a thickness measured from the inner edge 55e in the direction of the center axis O) of the brazing material layer at the inner edge 55e of the chamfered portion 55t increases and as the volume of the lap 15a on the chamfered portion 55t (which is a portion of the brazing material fillet lying outside the right cylindrical surface SC passing through the inner edge 55e around the center axis O) increases. It is thus decisive to what degree the thickness h of the brazing material and the volume of the lap 15a can be reduced for the purpose of suppressing the occurrence of cracks C or other defects.

Figure 4:
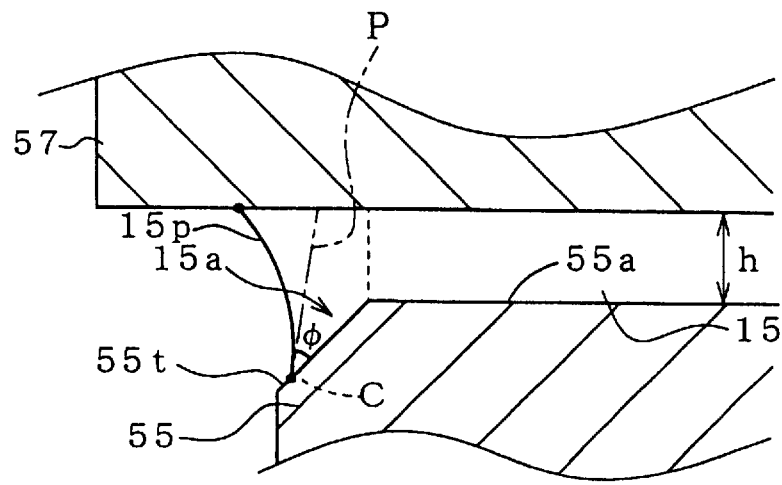
FIG. 4 is an enlarged sectional view of the joint based on the butt seal method.

The thickness h of the brazing material and the volume of the lap 15a vary depending on the type of a joint structure employed. FIG. 4 is a diagrammatic representation in an enlarged scale of the joint in the case of employing a butt seal. This structure corresponds to the case where the plate-like covering members 57 are directly brazed at their planar surface outer peripheral edges to the end faces of the tubular member 55 without any intervention of the cylindrical metal members 13 of FIG. 2. In this case, the planar surface of the covering member 57 confronts the end face of the tubular member 55 in a substantially parallel relationship over the full width of the end face of the tubular member 55, with the result that a peripheral edge 15p of the brazing material fillet presents a concave contour which is concave relative to both the planar surface of the covering member 57 in the form of the metal member and to the end face outer edge, i.e., the chamfered portion 55t of the tubular member 55. Then, a fillet angle φ tends to inevitably increase where the fillet angle φ is an angle defined between a brazing material fillet rising tangent line P at the edge position of the brazing material fillet 15 relative to the end face 55a (or the chamfered portion 55t) of the tubular member 55 and the chamfered portion 55t in a section containing the center axis of the tubular member 55. In such case, the molten brazing material is pulled upon brazing toward the planar surface outer edge of the covering member, i.e., in a direction substantially parallel to the end face 55a of the tubular member 55, so that flow of the brazing material onto the chamfered portion t is apt to occur, resulting in an increase in the volume of the lap 15a and the brazing material thickness h.

Figure 5:
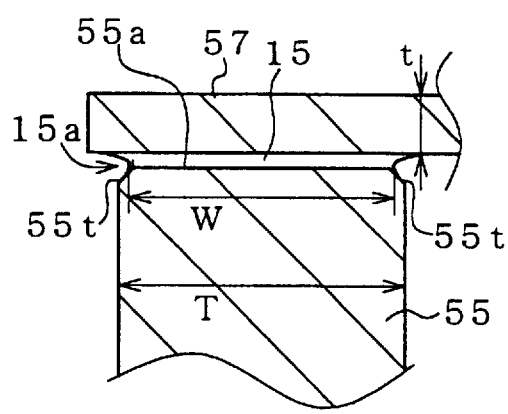
FIGS. 5(a) to 5(d) are explanatory diagrams showing a difference in effect between the edge seal method and the butt seal method.
Figure 5:
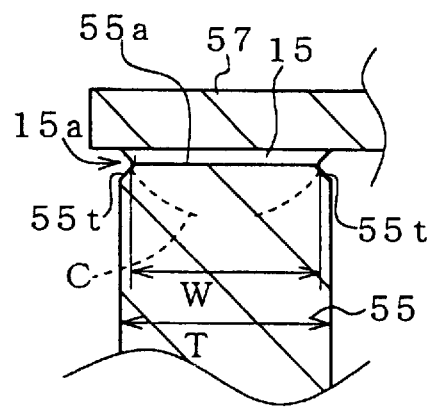
Figure 5:
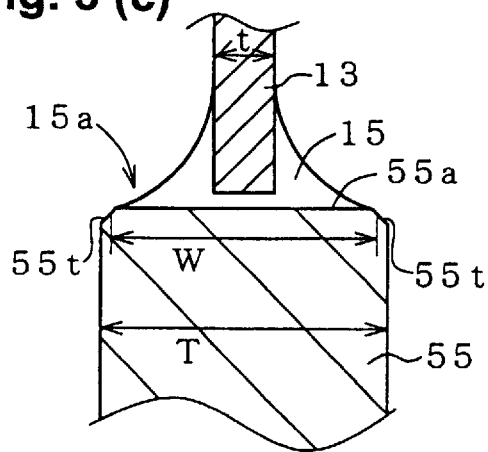
Figure 5:
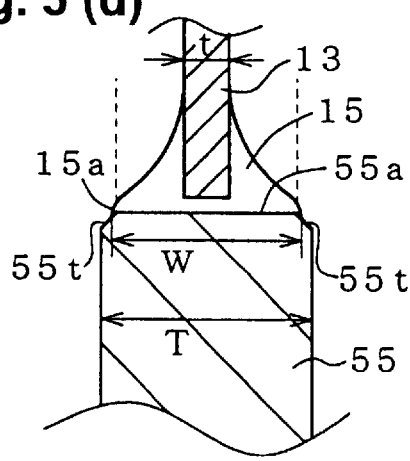

Then, in case a wall thickness T of the tubular member 55, i.e., the width W of the joint region is relatively large as shown in FIG. 5(a), the brazing material can thinly spread so that a large action works to contract the molten brazing material under surface tension, with the result that the lap 15a cannot grow to a large extent. This may prevent the occurrence of the cuts or other defects. In contrast, if the wall thickness T of the tubular member 55, i.e., the width W of the joint region is reduced as shown in FIG. 5(b) without varying the volume of the brazing material to a large extent, then a contracting action based on surface tension will not be so great. Thus, due to the factor described with reference to FIG. 4, the volume of the lap 15a becomes large, which may facilitate the occurrence of cracks C or other defects.

On the contrary, in case of the edge seal structure, as depicted in FIG. 3(a), the end face of the tubular portion 13b of the metal member 13 can confront the end face of the tubular member 55 at the middle in the end face width direction of the tubular member 55, whereupon the brazing material fillet 15 is pulled along the outer peripheral surface of the tubular portion 13b in a direction substantially orthogonal to the end face 55a of the tubular member 55. In this case, a fillet angle θ tends to become smaller where the fillet angle θ is an angle defined between the brazing material fillet tangent line P at each edge position of the brazing material fillet 15 relative to the end face 55a (or the chamfered portion 55t) of the tubular member 55 in a section containing the center axis of the tubular member 55 and the end face 55a of the tubular member 55. This suppresses the outflow of the brazing material onto the chamfered portion 55t.

For example, not only in case the wall thickness T of the tubular member 55, i.e., the width W of the joint region is relatively large as shown in FIG. 5(c), but also in case the wall thickness T of the tubular member 55, i.e., the width W of the joint region is reduced as shown in FIG. 5(d), the volume of the lap 15a or the thickness h of the brazing material layer cannot increase to a large extent due to the tensile force exerted on the tubular portion 13b, whereby the occurrence of cuts or other defects is suppressed. As already described, if the value of the joint region width W is not more than the upper limit Wmax (=D/30+3.1), then cuts or other defects, which could not have hitherto been prevented by use of the butt seal structure depicted in FIG. 4, can effectively be prevented by employing the edge seal structure as depicted in FIG. 3(a), thus enabling a composite having a high joint strength to be obtained. Also, the joint region width W is set to a value larger than the lower limit Wmin expressed by Wmin=(1/60)×D (mm) so as to ensure a sufficient joint area.

Preferably, the thickness t (mm) of the tubular portion 13b of the metal member 13 be set within a range of $(1/120) \times D \leq t \leq 3$. If t exceeds 3 mm, then a greater influence of the stress concentration arising from the contraction of the metal member will take place upon cooling after brazing for example, which may possibly make it difficult to completely suppress the occurrence of the cuts or other defects on the ceramic member 55. On the contrary, a thickness t of the tubular portion 13b of less than (1/120)×D may make it difficult to secure sufficient strength of the tubular portion 13b.

Figure 6:
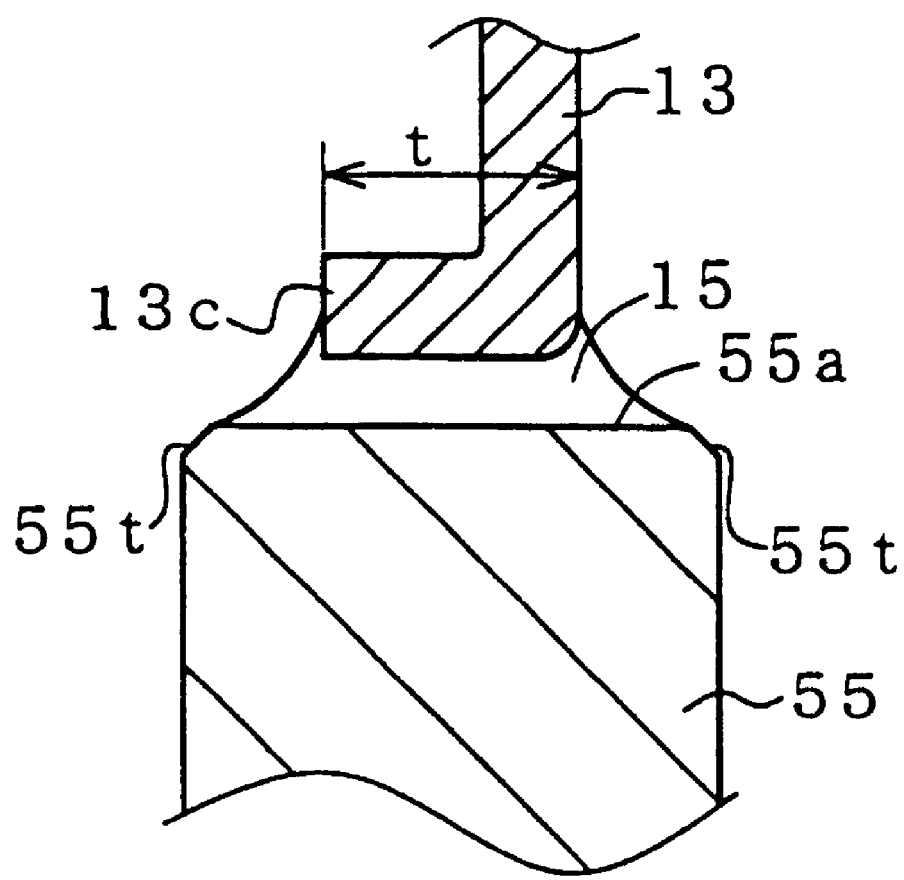
FIG. 6 is a sectional view of a variant of the joint structure based on the edge seal method.

Although in FIG. 2 the end face of the tubular portion 13b is butt joined to the end face 55a of the ceramic member 55, the tubular portion 13b may have at its extremity a flange 13c to provide an end portion having an L-shaped section so that the butt joint is effected on the planar surface of the flange 13c as shown in FIG. 6. In this case, the thickness t of the tubular portion 13b of the metal member 13 means, as shown, a dimension containing the protrusive length of the flange 13c.

It will be appreciated that the metal-ceramic composite of the present invention is applicable to a heat exchanger or other applications without being limited to the vacuum switch unit as set forth hereinabove.

EXAMPLE

Figure 7:
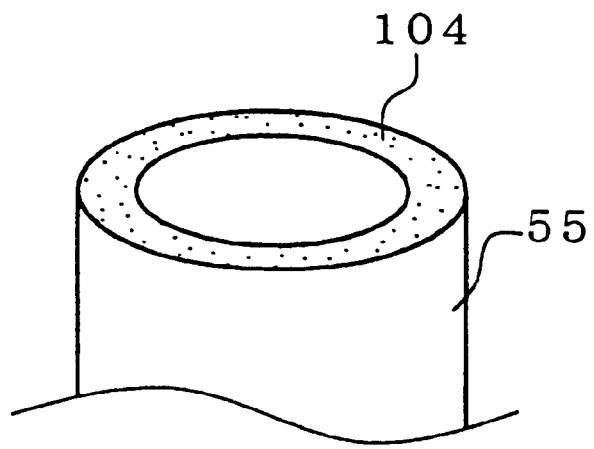
FIGS. 7(a) and 7(b) are explanatory diagrams showing manufacturing steps of the butt joint structure based on the edge seal method.
Figure 7:
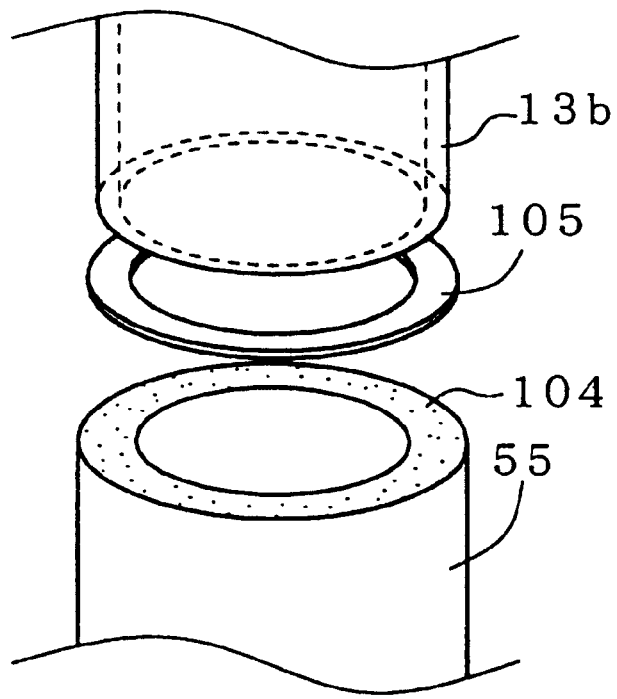

Tubular members 55 formed from alumina sintered bodies (each containing 92 percent alumina by mass) having various outer diameters D (mm) and inner diameters d (mm) were prepared. A 0.25 mm-wide chamfered portion was formed at the outer and inner edges of the end faces of each tubular member. A metallized paste containing Mo and Mn powders was applied to the opposite end faces of each tubular member, which was then subjected to baking at 1400° C. and thereafter to electrolytic Ni plating, to thereby form a metallized layer 104 on the end faces of the tubular member 55 as depicted in FIG. 7(a). Then, tubular metal 13b made of KOVAR having various thicknesses with corresponding outer diameters were concentrically positioned on the end faces of the tubular member 55 centrally in the width direction of the end faces of the tubular member 55, with an Ag-Cu eutectic brazing material (Ag—28 wt % Cu) foil 105 interposed therebetween as shown in FIG. 7(b) so that the butt joint was effected at a temperature of 830° C. by use of the edge seal method. The joint region width W was altered depending on the dimensions of the brazing material foil 105. As comparative examples, test articles were produced using the disk-like covering member 57 (FIG. 4) made of KOVAR in place of the metal tube 13b, with a similar joint structure in the butt sealed form. The joints of the thus obtained test articles were subjected to an appearance test to visually inspect the occurrence of cuts or other defects on the tubular member 55. The test articles completely free from the occurrence of cuts or other defects were evaluated as o, those allowing a slight occurrence of cuts or other defects were evaluated as Δ, and those having a multiplicity of observed cracks were evaluated as x. The results are shown in Table 1.

TABLE 1

| | Ceramic Member | | | | | Metal Member | | Judgment of Appearance |
|---|---|---|---|---|---|---|---|---|
| | D (mm) | D (mm) | (D-d)/2 (mm) | W (mm) | (D/30) + 3.1 (mm) | t (mm) | Form of Seal | |
| 1 | 60 | 49 | 5.5 | 5.0 | 5.1 | 2 | Edge | o |
| 2* | 60 | 49 | 5.5 | 5.0 | 5.1 | 2 | butt* | x |
| 3 | 60 | 51 | 4.5 | 4.0 | 5.1 | 2 | edge | o |
| 4* | 60 | 51 | 4.5 | 4.0 | 5.1 | 2 | butt* | x |
| 5 | 120 | 105 | 7.5 | 7 | 7.1 | 3 | edge | o |

TABLE 1-continued

| | Ceramic Member | | | | | Metal Member | | Judgment of Appearance |
|---|---|---|---|---|---|---|---|---|
| | D (mm) | D (mm) | (D-d)/2 (mm) | W (mm) | (D/30) + 3.1 (mm) | t (mm) | Form of Seal | |
| 6* | 120 | 105 | 7.5 | 7 | 7.1 | 3 | butt* | x |
| 7 | 120 | 110 | 5 | 4.5 | 7.1 | 3 | edge | o |
| 8* | 120 | 110 | 5 | 4.5 | 7.1 | 3 | butt* | x |
| 9 | 120 | 110 | 7.5 | 7 | 7.1 | 3.3 | edge | Δ |
| 10* | 60 | 48 | 6 | 5.5 | 5.1 | 2 | edge | o |
| 11* | 60 | 48 | 6 | 5.5 | 5.1 | 2 | butt* | o* |

*outside the scope of the invention.

These results demonstrate that, when the joint region width W is not more than Wmax=(D/30)+3.1 (mm), the butt seal allows cuts or other defects to significantly occur whereas the edge seal allows little or no occurrence of cuts or other defects so as to obtain excellent joint conditions. On the other hand, when the joint region width W is larger than Wmax, the butt seal can also present good joint conditions, which does not give a particular advantage to the edge seal.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

This application is based on Japanese Patent Application No. 2000-364860 filed Nov. 30, 2000, the disclosure of which is incorporated herein by reference in its entirety.

What is claimed is:

1. A metal-ceramic composite comprising: a metal member having a tubular portion; and a cylindrical ceramic member, said metal-ceramic composite having a structure in which an end face of said tubular portion of said metal member is butt joined via a joint-metal layer to an end face of said cylindrical ceramic member in an edge sealed manner, said cylindrical ceramic member having a chamfer at one or both of an inner peripheral edge and an outer peripheral edge of the end face of said cylindrical ceramic member, wherein said joint-metal layer and said ceramic member contact each other at an annular region of average width W which extends circumferentially around said end face of said ceramic member, and wherein W and D have respective values measured in mm which satisfy:

$D \geq 30$;

and $(1/60) \times D \leq W \leq (D/30) + 3.1$ where D is the outer diameter of said ceramic member.

2. The metal-ceramic composite according to claim 1, wherein said tubular portion of said metal member has a thickness t measured in mm which satisfies:

$(1/120) \times D \leq t \leq 3$.

3. The metal-ceramic composite according to claim 1, wherein said ceramic member is an outer envelope for a vacuum switch.

4. The metal-ceramic composite according to claim 2, wherein said ceramic member is an outer envelope for a vacuum switch.

5. A vacuum switch unit comprising:

a metal-ceramic composite according to claim 3;

a pair of covering members which cover opposite ends of said ceramic member, for forming a switch covering space within the interior of said ceramic member which is cylindrically shaped; and a pair of switch electrode members which are arranged so as to be able to come closer to or away from each other within said switch covering space, said pair of switch electrode members providing a switch contact portion.

6. A vacuum switch unit comprising:

a metal-ceramic composite according to claim 4;

a pair of covering members which cover opposite ends of said ceramic member, for forming a switch covering space within the interior of said ceramic member which is cylindrically shaped; and a pair of switch electrode members which are arranged so as to be able to come closer to or away from each other within said switch covering space, said pair of switch electrode members providing a switch contact portion.

7. The metal-ceramic composite according to claim 1, wherein said joint-metal layer overlaps at least a portion of said chamfer.

* * * * *